United States Patent
Matsushita et al.

(10) Patent No.: US 10,207,354 B2
(45) Date of Patent: Feb. 19, 2019

(54) INDIRECT SPOT WELDING APPARATUS

(71) Applicant: JFE STEEL CORPORATION, Tokyo (JP)

(72) Inventors: Muneo Matsushita, Chiba (JP); Rinsei Ikeda, Chiba (JP)

(73) Assignee: JFE Steel Corporation, Tokyo (JP)

( * ) Notice: Subject to any disclaimer, the term of this patent is extended or adjusted under 35 U.S.C. 154(b) by 338 days.

(21) Appl. No.: 14/916,269

(22) PCT Filed: Aug. 27, 2014

(86) PCT No.: PCT/JP2014/004405
§ 371 (c)(1),
(2) Date: Mar. 3, 2016

(87) PCT Pub. No.: WO2015/033537
PCT Pub. Date: Mar. 12, 2015

(65) Prior Publication Data
US 2016/0250709 A1 Sep. 1, 2016

(30) Foreign Application Priority Data

Sep. 4, 2013 (JP) ................................. 2013-182635

(51) Int. Cl.
*B23K 11/11* (2006.01)
*B23K 11/16* (2006.01)
(Continued)

(52) U.S. Cl.
CPC ............. *B23K 11/115* (2013.01); *B23K 11/16* (2013.01); *B23K 11/24* (2013.01); *B23K 11/255* (2013.01);
(Continued)

(58) Field of Classification Search
CPC ..... B23K 11/115; B23K 11/116; B23K 11/24; B23K 11/255; B23K 11/314; B23K 11/315
See application file for complete search history.

(56) References Cited

U.S. PATENT DOCUMENTS

| 5,869,799 A | 2/1999 | Arasuna |
| 9,089,924 B2 | 7/2015 | Matsushita |

(Continued)

FOREIGN PATENT DOCUMENTS

| CN | 101323046 A | 12/2008 |
| EP | 2002918 A2 | 12/2008 |

(Continued)

OTHER PUBLICATIONS

Extended European Search Report dated Aug. 8, 2016 for European Application No. 14842471.6, 8 pages.

(Continued)

*Primary Examiner* — Geoffrey S Evans
(74) *Attorney, Agent, or Firm* — RatnerPrestia (57) ABSTRACT

In the indirect spot welding apparatus, a lower limit in a stable pressing force region where the pressing force of the spot welding electrode against the metal sheets can be controlled within a tolerance of ±10% ranges from 70 N to 200 N and an upper limit in the stable pressing force region ranges from 800 N to 2000 N, and an overshoot OS(%)= (PL−AL)/AL×100 of the pressing force occurring when the spot welding electrode is pressed against the metal sheets is controlled to be 10% or less.

4 Claims, 3 Drawing Sheets

(51) Int. Cl.
  *B23K 11/31* (2006.01)
  *B23K 11/25* (2006.01)
  *B23K 11/24* (2006.01)
  *B23K 101/00* (2006.01)
  *B23K 101/18* (2006.01)
  *B23K 103/04* (2006.01)

(52) U.S. Cl.
  CPC .......... *B23K 11/314* (2013.01); *B23K 11/315* (2013.01); *B23K 2101/006* (2018.08); *B23K 2101/18* (2018.08); *B23K 2103/04* (2018.08)

(56) References Cited

U.S. PATENT DOCUMENTS

| 2008/0308533 | A1 | 12/2008 | Takahashi | |
| 2011/0272384 | A1* | 11/2011 | Matsushita | B23K 11/115 219/91.2 |
| 2012/0241416 | A1* | 9/2012 | Sakamoto | B23K 11/115 219/91.2 |

FOREIGN PATENT DOCUMENTS

| JP | 63273574 | 11/1988 |
| JP | 07132382 | 5/1995 |
| JP | H0970674 | 3/1997 |
| JP | 2000061650 | 2/2000 |
| JP | 2001071148 | 3/2001 |
| JP | 2002035953 | 2/2002 |
| JP | 2006181621 | 7/2006 |
| JP | 2007268604 | 10/2007 |
| JP | 2008307575 | 12/2008 |
| JP | 4209570 | 1/2009 |
| JP | 2010194609 | 9/2010 |
| JP | 2011194459 | 10/2011 |
| JP | 2012035278 | 2/2012 |
| JP | 2012091203 | 5/2012 |
| JP | 2012157888 | 8/2012 |
| JP | 2013059791 A | 4/2013 |

OTHER PUBLICATIONS

Database WPI—Week 199721, XP002760173, Thomson Scientific, London, GB, AN 1997-230366, 1 page.
Korean Office Action for Korean Application No. 10-2016-7003500, dated Mar. 15, 2017, with Concise Statement of Revelance of Office Action—5 Pages.
Chinese Office Action for Chinese Application No. 201480048662, dated Apr. 6, 2017, with Concise Statement of Relevace of Office Action—8 Pages.
European Office Action for Application No. 14842471.6, dated Jul. 12, 2017, 4 pages.
International Search Report for International Application No. PCT/JP2014/004405 dated Oct. 7, 2014.
Written Opinion of the International Searching Authority for International Application No. PCT/JP2014/004405 dated Oct. 7, 2014.
European Communication for European Application No. 14 842 471.6, dated Mar. 16, 2018, 5 pages.

* cited by examiner

INDIRECT SPOT WELDING APPARATUS

CROSS REFERENCE TO RELATED APPLICATIONS

This is the U.S. National Phase application of PCT/JP2014/004405, filed Aug. 27, 2014, which claims priority to Japanese Patent Application No. 2013-182635, filed Sep. 4, 2013, the disclosures of each of these applications being incorporated herein by reference in their entireties for all purposes.

FIELD OF THE INVENTION

The present invention relates to an indirect spot welding apparatus in which a member composed of at least two overlapping metal sheets (member to be welded) is welded by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point.

BACKGROUND OF THE INVENTION

For welding of automobile bodies and automobile components, resistance spot welding, particularly direct spot welding, has been primarily used. Recently, series spot welding and indirect spot welding have also been increasingly used.

Figure 1:
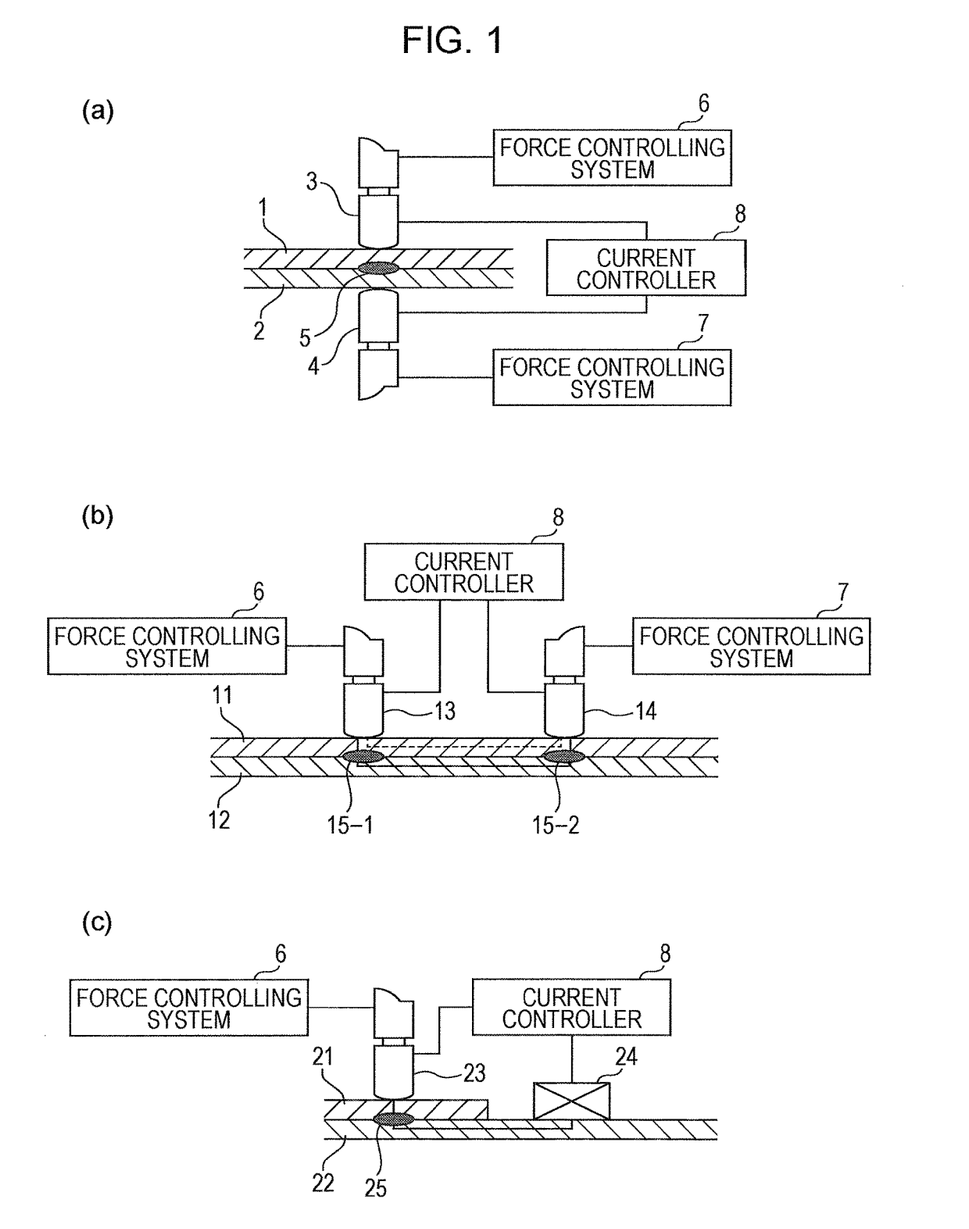
FIG. 1(a) illustrates how welding is performed by a direct spot welding method.
FIG. 1(b) illustrates how welding is performed by a series spot welding method.
FIG. 1(c) illustrates how welding is performed by an indirect spot welding method.

Features of the three types of spot welding described above will be explained with reference to FIG. 1.

The three types of spot welding described above are the same in that at least two overlapping metal sheets are joined together by welding.

FIG. 1(a) illustrates a direct spot welding method. As illustrated, this welding involves passing a current through two overlapping metal sheets 1 and 2 sandwiched between a pair of electrodes 3 and 4 while applying pressure to the electrodes 3 and 4 from above and below. Thus, through the use of resistance heat between the metal sheets 1 and 2, a point-like welded portion (nugget) 5 is obtained. The electrodes 3 and 4 are provided with respective force controlling systems 6 and 7 and a current controller 8, whereby a pressing force and a current can be controlled.

FIG. 1(b) illustrates a series spot welding method. As illustrated, this welding involves passing a current through two overlapping metal sheets 11 and 12 while applying pressure to a pair of electrodes 13 and 14 from the same side (in the same direction) at separate locations. Thus, point-like welded portions (nuggets) 15-1 and 15-2 are obtained.

FIG. 1(c) illustrates an indirect spot welding method. As illustrated, this welding involves pressing an electrode 23 against one (metal sheet 21) of two overlapping metal sheets 21 and 22 while applying pressure to the electrode 23, attaching a feeding point 24 to the other metal sheet 22 at a location separate from the electrode 23, and passing a current between the electrode 23 and the feeding point 24. Thus, a point-like welded portion (nugget) 25 is formed between the metal sheets 21 and 22.

Of the three welding methods described above, the direct spot welding method is used when there is enough space which allows the metal sheets to be sandwiched from above and below. In actual welding, however, it is often difficult to create enough space or to sandwich the metal sheets from above and below in a closed cross-sectional structure. In such cases, the series spot welding method or the indirect spot welding method is used.

However, when the series spot welding method or the indirect spot welding method is used for applications, such as those described above, the electrode applies pressure to the overlapping metal sheets from only one side while the other side of the metal sheets is in an unsupported and hollow state. Therefore, unlike the direct spot welding method where the metal sheets are sandwiched between electrodes on both sides, a large pressing force cannot be locally applied to a welded portion. Moreover, since the electrode sinks into the metal sheet during passage of current, the state of contact between the electrode and the metal sheet and the state of contact between the metal sheets change. This results in instability in a current path between the overlapping metal sheets, and makes it difficult to form a fused joint.

As a solution to the problems described above, the present inventors previously disclosed an indirect spot welding method involving two-stage control in Patent Literature 1. The indirect spot welding method disclosed in Patent Literature 1 is for welding a member composed of at least two overlapping metal sheets by pressing a spot welding electrode against the metal sheets while applying pressure to the spot welding electrode from one side of the member, attaching a feeding point to the metal sheet on; the other side of the member at a location separate from the spot welding electrode, and passing a current between the spot welding electrode and the feeding point. For an electrode force and a current in the indirect spot welding method, the time from turning on electricity is divided into two time periods $t_1$ and $t_2$. Then, a pressing force $F_1$ and a current $C_1$ are applied in the first time period $t_1$, and a pressing force $F_2$ smaller than $F_1$ and a current $C_2$ larger than $C_1$ are applied in the next time period $t_2$.

Also, the present inventors found out that the indirect spot welding method disclosed in Patent Literature 1 could be more effectively carried out by defining the pressing force $F_1$ and the current $C_1$ applied in the first time period $t_1$ of the two time periods $t_1$ and $t_2$ after turning on electricity and the pressing force $F_2$ and the current $C_2$ applied in the next time period $t_2$ as in the following expressions (2.1) to (2.4), where T (mm) represents the total thickness of the overlapping metal sheets. This finding was disclosed in Patent Literature 2.

$$1.2F_2 \leq F_1 \leq 5F_2 \quad (2.1)$$

$$0.25C_2 \leq C_1 \leq 0.85C_2 \quad (2.2)$$

$$35T^{2.3} \leq F_2 \leq 170T^{1.9} \quad (2.3)$$

$$2T^{0.5} \leq C_2 \leq 5.5T^{0.9} \quad (2.4)$$

As an improved version of the technique described above, the present inventors further developed and disclosed an indirect spot welding method involving three-stage control, instead of two-stage control, in Patent Literature 3. The indirect spot welding method disclosed in Patent Literature 3 is for welding a member composed of at least two overlapping metal sheets by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point. For an electrode force and a current in the indirect spot welding method, the time from turning on electricity is divided into three time periods $t_1$, $t_2$, and $t_3$. Then, a pressing force $F_1$ and a current $C_1$ are applied in the first time period $t_1$, a pressing force $F_2$ smaller than $F_1$ and a current $C_2$ larger than $C_1$ are applied in the next time period $t_2$, and a pressing force $F_3$ smaller than or equal to $F_2$ and a current $C_3$ larger than $C_2$ are applied in the next time period $t_3$.

The present inventors further found out that the indirect spot welding method disclosed in Patent Literature 4 could be more effectively carried out by defining the pressing force $F_1$ and the current $C_1$ applied in the first time period $t_1$ of the three time periods $t_1$, $t_2$, and $t_3$ after turning on electricity, the pressing force $F_2$ and the current $C_2$ applied in the next time period $t_2$, and the pressing force $F_3$ and the current $C_3$ applied in the next time period $t_3$ as in the following expressions (4.1) to (4.6), where T (mm) represents the total thickness of the overlapping metal sheets. This finding was disclosed in Patent Literature 4.

$$1.2F_2 \le F_1 \le 3F_2 \tag{4.1}$$

$$0.25C_2 \le C_1 \le 0.9C_2 \tag{4.2}$$

$$F_3 \le F_2 \le 3F_3 \tag{4.3}$$

$$0.5C_3 \le C_2 \le 0.9C_3 \tag{4.4}$$

$$30T^{2.1} \le F_3 \le 170T^{1.9} \tag{4.5}$$

$$2T^{0.5} \le C_3 \le 5.5T^{0.9} \tag{4.6}$$

Control of current during welding in the indirect spot welding methods disclosed in Patent Literatures 1 and 3 is made possible, for example, by using a resistance spot welding controller capable of controlling a current for each cycle described in Patent Literature 5. The ranges of currents disclosed in Patent Literatures 2 and 4 can be satisfied by a normal welding apparatus.

Control of pressing force during welding in the indirect spot welding methods disclosed in Patent Literatures 1 and 3 may be achieved, for example, by using a spot welding machine disclosed in Patent Literature 6. The spot welding machine has a means for controlling a pressing force at any time on a real-time basis during passage of welding current. Commercially available resistance spot welding controllers of a servomotor pressure type include those having the function described above.

The resistance spot welding controllers of a normal type (Patent Literatures 5 and 6, commercially available) described above are designed on the assumption that an electrode force is set to a relatively large value. This means that it is not necessarily possible to stably achieve a set pressing force in a range of relatively small pressing forces preferable in the indirect spot welding method. Additionally, in the indirect spot welding methods disclosed in Patent Literatures 2 and 4, it is necessary to control a pressing force during welding with high precision.

Patent Literature 7 discloses a stationary welding apparatus which is a stationary indirect welding apparatus configured to perform indirect welding of a work. In the stationary welding apparatus, a back bar for receiving the work is disposed on a base. A drive unit that moves a movable electrode chip downward toward the back bar to apply pressure to the work is mounted on a support frame secured to the base. The drive unit is formed by an electric drive unit that uses a servomotor as a drive source. The drive unit has a casing containing a motion conversion mechanism. The servomotor is attached onto the casing. A rod that is moved up and down through the motion conversion mechanism by rotation of the servomotor protrudes downward from the casing. The movable electrode chip is attached to a lower end of the rod, with a chip holder interposed therebetween. In the casing, the drive unit is supported to be movable up and down with respect to the support frame and to be downwardly biased by a biasing means formed by a coil spring or the like.

With the electric drive unit, the indirect welding apparatus can provide fine control of pressing force. Also, when weld penetration in the work occurs by passage of current, even though the operation of the movable electrode chip may be delayed by the electric drive unit itself, a biasing force of the biasing means allows the movable electrode chip to responsively follow the weld penetration in the work. As a result, scattering of spatters can be prevented.

However, the indirect welding apparatus disclosed in Patent Literature 7 is designed based on the assumption that the back bar for receiving a work is disposed on the base. Nothing is described about indirect welding in which the opposite side of the movable electrode is in an unsupported and hollow state.

Patent Literature 7 states that by providing both the drive unit driven by the servomotor and the biasing means formed by the coil spring, fine control of pressing force can be achieved and the biasing force of the biasing means allows the movable electrode chip to responsively move when weld penetration in the work occurs. However, this indirect welding apparatus may be designed based on the assumption that a pressing force is kept constant during welding. In the case of changing a pressing force during welding as disclosed in Patent Literatures 1 to 4, when the servomotor is driven to control the pressing force, the servomotor needs to be continuously driven until the pressing force is balanced with the reactive force of the coil spring. As a result, sufficient responsiveness cannot be achieved. Moreover, since inertia that occurs when the servomotor is driven causes repetitive motion of the coil spring, a stable pressing force cannot be obtained until the repetitive motion is attenuated. No solutions to these problems are described in Patent Literature 7.

CITATION LIST

Patent Literature

PTL 1: Japanese Unexamined Patent Application Publication No. 2010-194609
PTL 2: Japanese Unexamined Patent Application Publication No. 2012-035278
PTL 3: Japanese Unexamined Patent Application Publication No. 2011-194459
PTL 4: Japanese Unexamined Patent Application Publication No. 2012-91203
PTL 5: Japanese Unexamined Patent Application Publication No. 63-273574
PTL 6: Japanese Unexamined Patent Application Publication No. 7-132382
PTL 7: Japanese Patent No. 4209570

SUMMARY OF THE INVENTION

Aspects of the present invention has been made in view of the circumstances described above. Aspects of the present invention relate to indirect spot welding in which a member composed of at least two overlapping metal sheets is welded by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point. Aspects of the present invention aim to provide an indirect spot welding apparatus in which, even when the spot welding electrode applies pressure to the overlapping metal sheets from only one side to weld a portion whose opposite side is in an unsupported and hollow state, it is possible to accurately control a pressing force of the spot welding electrode and stably obtain a spot welded portion (spot welded joint) having a satisfactory strength.

As a result of studies intended to solve the problems described above, the present inventors have obtained the following findings (a) to (d).

(a) When an electrode applies pressure to overlapping metal sheets from only one side to perform indirect spot welding while the other side is an unsupported and hollow state, a large electrode force cannot be applied to the overlapping metal sheets, unlike direct spot welding where overlapping metal sheets are sandwiched between electrodes on both sides. Accordingly, it is necessary to stably achieve the output of an accurate pressing force in a range of small pressing forces. A lower limit in the range of pressing forces which need to be stably output is from 70 N to 200 N, and an upper limit in the range is from 800 N to 2000 N. In this range, the pressing force needs to be controlled within a tolerance of ±10% (+10% to −10%).

(b) When the spot welding electrode is pressed against the metal sheets, an overshoot of the pressing force occurs if a contact speed of the electrode is too high. When the overshoot occurs, an excessive pressing force is momentarily applied to a welded portion. In the case of performing indirect spot welding particularly when the opposite side of the electrode is in an unsupported and hollow state, the welded portion is significantly deformed, which may affect the quality of welding. An effective solution to this is that the overshoot represented by OS in Equation (1) is controlled to be 10% or less:

$$OS(\%) = (PL - AL)/AL \times 100 \quad (1)$$

where PL represents a peak pressing force (N) in an overshoot range and AL represents an average pressing force (N) applied by the electrode.

(c) As a configuration of an indirect spot welding apparatus that satisfies (a) and (b) described above, a drive unit that linearly moves the electrode to apply pressure to a member to be welded is mounted, and a servomotor is used as a drive source. The indirect spot welding apparatus preferably has the drive unit in which, when the pressing force is at a lower limit (ranging from 70 N to 200 N), the output of the servomotor is 30% or more of a rated output and the contact speed of the spot welding electrode being pressed against the metal sheet ranges from 1 mm/s to 30 mm/s.

(d) To achieve high-precision control in controlling the pressing force during welding disclosed in Patent Literatures 1 to 4, the drive unit that uses the servomotor as a drive source to apply pressure to the member to be welded is preferably secured to a robot by a sufficiently rigid bracket or the like, without using an elastic body, such as a coil spring. Additionally, it is desirable that when the output of the servomotor is converted to an electrode force, the sliding resistance of the drive unit be sufficiently small.

Aspects of the present invention are based on the findings described above and include the following features.

[1] An indirect spot welding apparatus is configured to weld a member composed of at least two overlapping metal sheets by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point. In the indirect spot welding apparatus, a lower limit in a stable pressing force region where the pressing force of the spot welding electrode against the metal sheets can be controlled within a tolerance of ±10% ranges from 70 N to 200 N and an upper limit in the stable pressing force region ranges from 800 N to 2000 N. An overshoot of the pressing force occurring when the spot welding electrode is pressed against the metal sheets is represented by OS in Equation (1), and OS is controlled to be 10% or less:

$$OS(\%) = (PL - AL) \times 100/AL \quad (1)$$

where PL represents a peak pressing force (N) in an overshoot range and AL represents an average pressing force (N) applied by the electrode.

[2] In the indirect spot welding apparatus described in [1], a drive unit configured to linearly move the spot welding electrode to apply pressure to the member to be welded is mounted. The drive unit uses a servomotor as a drive source. When the pressing force is a lower limit in the stable pressing force region, an output of the servomotor is 30% or more of a rated output and a contact speed of the spot welding electrode being pressed against the metal sheets ranges from 1 mm/s to 30 mm/s.

In accordance with aspects of the present invention, a pressing force can be stably set in a range of relatively small pressing forces, which has been considered difficult in conventional indirect spot welding. Accordingly, even when the spot welding electrode applies pressure to the overlapping metal sheets from only one side to perform indirect spot welding of a portion whose opposite side is in an unsupported and hollow state, it is possible to accurately control a pressing force of the spot welding electrode and stably obtain a spot welded portion (spot welded joint) having a satisfactory strength.

DETAILED DESCRIPTION OF EMBODIMENTS OF THE INVENTION

An embodiment of the present invention will be described on the basis of the drawings.

Figure 2:
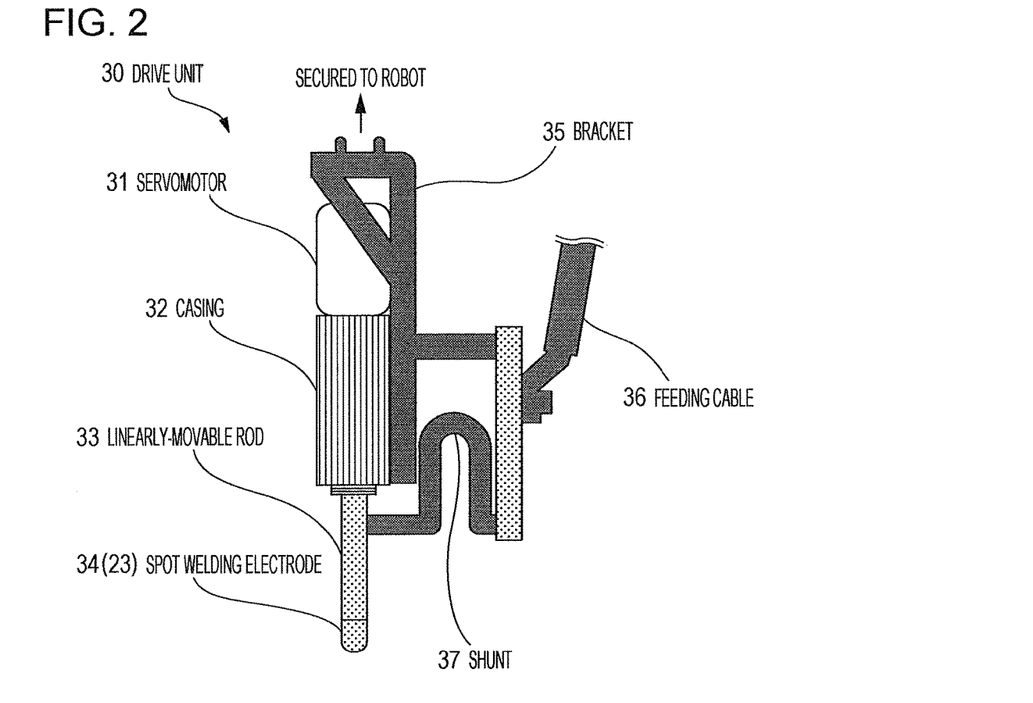
FIG. 2 illustrates a drive unit of an indirect spot welding apparatus according to an embodiment of the present invention.

FIG. 2 illustrates a drive unit mounted in an indirect spot welding apparatus (indirect spot welding robot apparatus) according to an embodiment of the present invention.

In the embodiment of the present invention, the indirect spot welding robot apparatus needs to have a drive unit mounted therein which uses a servomotor as a drive source to apply pressure to a member to be welded. As illustrated in FIG. 2, a drive unit 30 has a casing 32 containing a motion conversion mechanism. A rotational motion of a servomotor 31 is converted via the casing 32 to a linear motion of a linearly-movable rod 33, which allows a spot welding electrode 34 (23) to apply pressure to the member to be welded. The drive unit 30 is preferably secured to a welding robot by a sufficiently rigid bracket 35 or the like without using an elastic body, such as a coil spring. It is desirable that when the output of the servomotor 31 is converted to a pressing force, the sliding resistance of the drive unit 30 be sufficiently small. The motion conversion mechanism contained in the casing 32 may have a ball screw structure. In FIG. 2, reference numeral 36 denotes a feeding cable and reference numeral 37 denotes a shunt (bypass line).

The drive unit 30 needs to be capable of controlling the pressing force within a tolerance of ±10% (+10% to −10%) in a lower limit range of 70 N to 200 N and an upper limit range of 800 N to 2000 N. Additionally, when the pressing force is at the lower limit (ranging from 70 N to 200 N), the output of the servomotor 31 is desirably 30% or more of a rated output. Normally, the servomotor 31 can stably operate in the range of 30% to 300% of the rated output. Accordingly, the pressing force needs to range from 70 N to 200 N when the output of the servomotor 31 is 30% of the rated output, and needs to range from 800 N to 2000 N when the output of the servomotor 31 is 300% of the rated output.

In other words, if the lower limit in a stable pressing force region of the servomotor 31 exceeds the range of 70 N to 200 N, a proper pressing force range for indirect spot welding is not satisfied when the total sheet thickness of the member to be welded is small. Also, if the upper limit in the stable pressing force region of the servomotor 31 is below the range of 800 N to 2000 N, the proper pressing force range for indirect spot welding is not satisfied when the total sheet thickness of the member to be welded is large. Here, the total sheet thickness of the member to be welded is assumed to range from 1.0 mm to 6.0 mm.

Figure 4:
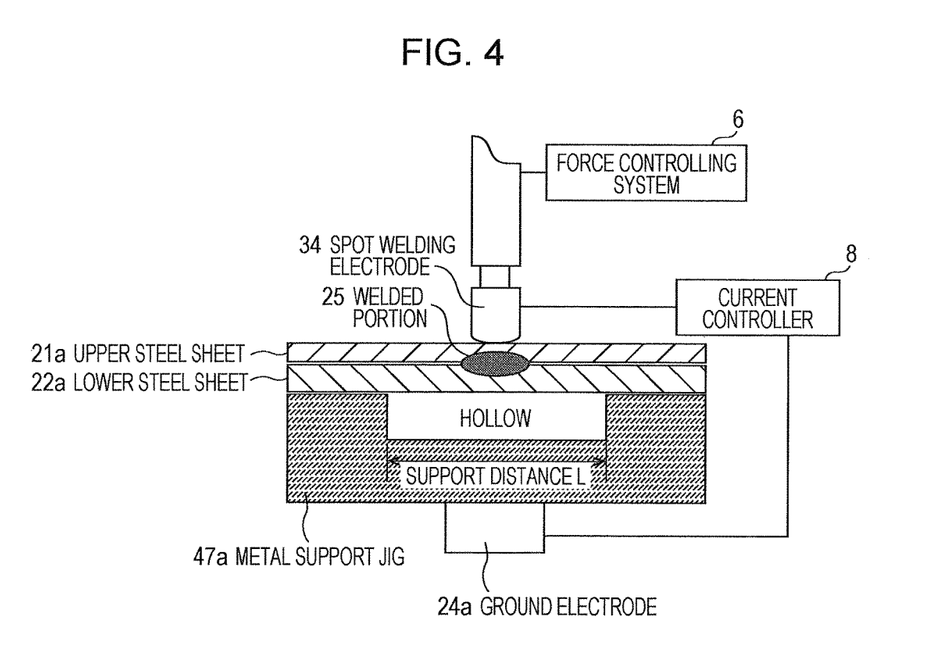
FIG. 4 illustrates an indirect spot welding apparatus used in EXAMPLE 3.

When the spot welding electrode 34 is pressed against the metal sheet 21 (upper steel sheet 21a) as illustrated in FIG. 4 (described below), an overshoot of the pressing force occurs if a contact speed of the spot welding electrode 34 is too high. When the overshoot occurs, an excessive pressing force is momentarily applied to the welded portion 25. Therefore, particularly when indirect spot welding is performed while the opposite side of the spot welding electrode 34 is in an unsupported and hollow state, the welded portion 25 is significantly deformed, which may affect the quality of welding.

An effective solution to this is that the overshoot represented by OS in Equation (1) is controlled to be 10% or less:

$$OS(\%) = (PL - AL)/AL \times 100 \quad (1)$$

where PL represents a peak pressing force (N) in an overshoot range and AL represents an average pressing force (N) applied by the electrode.

To control OS in Equation (1) to be 10% or less, the contact speed of the spot welding electrode 34 that is being pressed against the metal sheet 21 is desirably 30 mm/s or less. For example, in the case of a drive unit using a pneumatic cylinder as a drive source, the moving speed of the spot welding electrode 34 cannot be variable-controlled. Accordingly, if the moving speed is set in accordance with the contact speed, since it takes time to move the spot welding electrode 34, the overall operation time may be affected and work efficiency may be degraded. On the other hand, in the case of the drive unit 30 using the servomotor 31 as a drive source as in the present embodiment, the moving speed of the spot welding electrode 34 can be variable-controlled. Accordingly, the moving speed (contact speed) needs to be 30 mm/s or less only when the spot welding electrode 34 comes into contact with the member to be welded. Thus, high work efficiency can be maintained, and this is effective in terms of productivity.

On the other hand, if the contact speed is below 1 mm/s, the work efficiency is greatly degraded because it takes too much time to bring the spot welding electrode into contact with the member to be welded. Accordingly, it is desirable that the contact speed be 1 mm/s or more.

Figure 3:
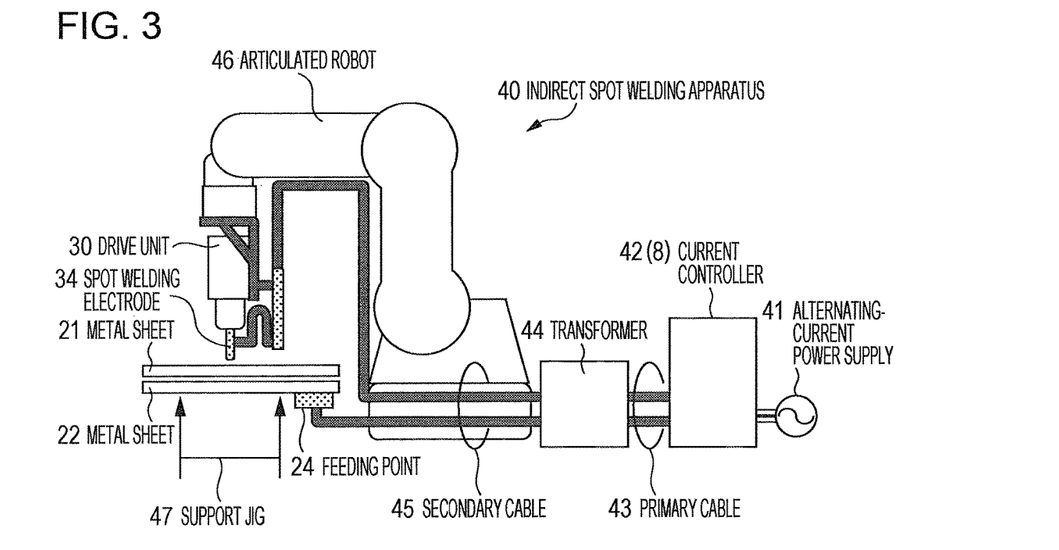
FIG. 3 illustrates an indirect spot welding apparatus according to an embodiment of the present invention.

FIG. 3 illustrates an indirect spot welding apparatus (indirect spot welding robot apparatus) according to an embodiment of the present invention.

With the drive unit 30 attached to an articulated robot 46 as illustrated in FIG. 3, an indirect spot welding apparatus (indirect spot welding robot apparatus) 40 can freely change the welding position. Accordingly, the indirect spot welding apparatus 40 can be widely used for welding of automotive components, automotive bodies, and the like. Robots, other than articulated robots, can be appropriately selected in accordance with the intended use.

A welding current flows from an alternating-current power supply 41, passes through a current controller 42 (8), a primary cable 43, and a transformer 44, and is rectified to a set welding current. The welding current further passes through a secondary cable 45 and is supplied to both the spot welding electrode 34 attached at an end of the drive unit 30 and the feeding point 24 attached to the metal sheet 22.

In indirect spot welding, a circuit formed by the secondary cable 45 is long. To minimize impedance, it is desirable that electricity flowing through the secondary-side circuit be a direct current. That is, although examples of a current controller for resistance spot welding include a single-phase alternating current type, an inverter alternating current type, and an inverter direct current type, it is desirable in this case to select a current controller of an inverter direct current type. At the same time, using a resistance spot welding controller capable of controlling a current for each cycle makes it possible to properly control current during welding.

Additionally, as illustrated in FIG. 3, in the indirect spot welding apparatus 40 of the present embodiment, the opposite side of the spot welding electrode 34 with respect to the member to be welded (metal sheets 21 and 22) can be left in an unsupported and hollow state. There is no need to attach a back bar, such as that described in Patent Literature 7, to a support jig 47 that supports the member to be welded (metal sheets 21 and 22) on the opposite side of the spot welding electrode 34.

Thus, in the present embodiment, a pressing force can be stably set in a range of relatively small pressing forces, which has been considered difficult in conventional indirect spot welding. Accordingly, even when the spot welding electrode 34 applies pressure to the overlapping metal sheets 21 and 22 from only one side to perform indirect spot welding of a portion whose opposite side is in an unsupported and hollow state, an accurate pressing force can be stably output in the range of electrode forces (lower limit: 70 N to 200 N, upper limit: 800 N to 2000 N) from the initial stage of application of electrode force. Additionally, even in the case of changing the pressing force during welding as described in Patent Literatures 1 to 4, it is possible to control the pressing force of the spot welding electrode 23 with high precision and to stably obtain a spot welded portion (spot welded joint) having a satisfactory strength.

EXAMPLE 1

EXAMPLE 1 of the present invention will be described.

EXAMPLE 1 examined the performance of each of drive units (Drive Units 1 to 5) based on the drive unit having the configuration of FIG. 2 and mounted in the indirect spot welding apparatus of FIG. 3. Drive Units 1 to 5 are designed to specifications shown in Table 1.

In Table 1, a pressing force lower limit refers to a pressing force applied when the output of the servomotor 31 is 30% of the rated output, and a pressing force upper limit refers to a pressing force applied when the output of the servomotor 31 is 300% of the rated output.

Here, Drive Units 1 to 4 having pressing force lower limits ranging from 70 N to 200 N and pressing force upper limits ranging from 800 N to 2000 N are defined as Inventive Examples A to D, and Drive Unit 5 not having them is defined as Comparative Example A.

Table 2 shows that when the set pressing force was 200 N, a deviation of the smallest value from the set value and a deviation of the largest value from the set value were both within the ±10% tolerance and no significant deviations were observed in any of Drive Units 1 to 4 (Inventive Examples A to D). On the other hand, in Drive Unit 5 (Comparative Example A), a deviation was outside the ±10% tolerance and significant variation was observed. When the pressing force was 800 N, the deviations described above were both within the ±10% tolerance in each of the drive units (Drive Units 1 to 5).

EXAMPLE 2

EXAMPLE 2 of the present invention will be described.

Drive Unit 2 shown in Tables 1 and 2 was used in EXAMPLE 2. The pressing force was set at 200 N and 800 N, and the electrode contact speed was varied from 10 mm/s to 80 mm/s. Then, an overshoot of the pressing force occurring when the spot welding electrode was pressed against the metal sheet was evaluated using OS in Equation (1) described above. The result is shown in Table 3.

TABLE 1

| | Servomotor Size (W) | Ball Screw Lead (mm) | Pressing Force Lower Limit (N) (Motor Output 30%) | Pressing Force Upper Limit (N) (Motor Output 300%) | Remarks |
| --- | --- | --- | --- | --- | --- |
| Drive Unit 1 | 200 | 10 | 100 | 960 | Inventive Example A |
| Drive Unit 2 | 400 | 25 | 80 | 800 | Inventive Example B |
| Drive Unit 3 | 750 | 25 | 150 | 1440 | Inventive Example C |
| Drive Unit 4 | 750 | 20 | 180 | 1800 | Inventive Example D |
| Drive Unit 5 | 1000 | 10 | 500 | 5000 | Comparative Example A |

For each of Drive Units 1 to 5 shown in Table 1, without passing a welding current, a pressing force was measured 10 times when the electrode contact speed was 20 mm/s and the pressing force was set at 200 N and 800 N. Then, a smallest value, a deviation of the smallest value from the set value, a largest value, and a deviation of the largest value from the set value were determined. The results are shown in Table 2.

Here, the cases where the electrode contact speeds were 10 mm/s, 20 mm/s, and 30 mm/s are defined as Inventive Example a, Inventive Example b, and Inventive Example c, respectively, and the cases where the electrode contact speeds were 40 mm/s, 60 mm/s, and 80 mm/s are defined as Comparative Example a, Comparative Example b, and Comparative Example c, respectively.

TABLE 2

| | Set Pressing Force: 200 N | | | | Set Pressing Force: 800 N | | | | |
| --- | --- | --- | --- | --- | --- | --- | --- | --- | --- |
| | Smallest Value (N) | Deviation (%) of Smallest Value from Set Value | Largest Value (N) | Deviation (%) of Largest Value from Set Value | Smallest Value (N) | Deviation (%) of Smallest Value from Set Value | Largest Value (N) | Deviation (%) of Largest Value from Set Value | Remarks |
| Drive Unit 1 | 199 | −0.5 | 203 | 1.5 | 800 | 0.0 | 808 | 1.0 | Inventive Example A |
| Drive Unit 2 | 189 | −5.5 | 200 | 0.0 | 798 | −0.3 | 808 | 1.0 | Inventive Example B |
| Drive Unit 3 | 191 | −4.5 | 211 | 5.5 | 796 | −0.5 | 810 | 1.3 | Inventive Example C |
| Drive Unit 4 | 193 | −3.5 | 210 | 5.0 | 795 | −0.6 | 808 | 1.0 | Inventive Example D |
| Drive Unit 5 | 190 | −5.0 | 235 | 17.5 | 794 | −0.8 | 811 | 1.4 | Comparative Example A |

TABLE 3

| Contact Speed (mm/s) | 200 N | | | 800 N | | | Remarks |
|---|---|---|---|---|---|---|---|
| | Average Value AL (N) | Peak Value PL (N) | OS (%) | Average Value AL (N) | Peak Value PL (N) | OS (%) | |
| 10 | 203 | 215 | 6 | 794 | 791 | 0 | Inventive Example a |
| 20 | 203 | 217 | 7 | 796 | 787 | −1 | Inventive Example b |
| 30 | 204 | 220 | 8 | 799 | 788 | −1 | Inventive Example c |
| 40 | 208 | 239 | 15 | 801 | 795 | −1 | Comparative Example a |
| 60 | 208 | 405 | 95 | 808 | 840 | 4 | Comparative Example b |
| 80 | 209 | 566 | 171 | 802 | 843 | 5 | Comparative Example c |

As shown in Table 3, when the pressing force was 200 N, OS was less than 10% in Inventive Examples a to c where the contact speed was 30 mm/s or less. On the other hand, in Comparative Examples a to c where the contact speed was higher than 30 mm/s, OS exceeded 10% and reached 171% particularly when the contact speed was 80 mm/s. When the pressing force was 800 N, OS was less than 10% at a contact speed of 10 mm/s to 80 mm/s (Inventive Examples a to c, Comparative Examples a to c).

EXAMPLE 3

EXAMPLE 3 of the present invention will be described.

In EXAMPLE 3, indirect spot welding of steel sheets (the upper steel sheet 21*a* and the lower steel sheet 22*a*) was performed as illustrated in FIG. 4 using the indirect spot welding apparatus 40 illustrated in FIG. 3.

Drive Units 1, 3, and 5 shown in Tables 1 and 2 were used as drive units, and a current controller of a direct-current inverter type was used as the current controller 8. The spot welding electrode 34 made of a chromium copper alloy and having a uniform curvature radius of 40 mm at an end thereof was used.

The upper steel sheet 21*a* and the lower steel sheet 22*a* were placed on a U-shaped metal support jig 47*a* illustrated in FIG. 4. The upper steel sheet 21*a* is an SPC270 steel sheet having a tensile strength of 270 MPa or more and a thickness of 0.7 mm, containing chemical components shown in Table 4, and having the balance of Fe and inevitable impurities. The lower steel sheet 22*a* is an SPC270 steel sheet having a tensile strength of 270 MPa or more and a thickness of 1.2 mm, containing chemical components shown in Table 4, and having the balance of Fe and inevitable impurities. A support distance L was 30 mm, and a ground electrode 24*a* serving as the feeding point 24 was attached to the bottom of the metal support jig 47*a*. Then, the spot welding electrode 34 applies pressure to the upper steel sheet 21*a* and the lower steel sheet 22*a* from above for indirect spot welding. The contact speed of the spot welding electrode 34 was 30 mm/s or 50 mm/s.

Welding conditions (pressing force F, current C) were set as shown in Table 5. In Welding Condition 1 in Table 5, the pressing force F and the current C were constant during the period from "turning on" to "turning off" electricity. In Welding Condition 2 in Table 5, the time period was divided into first and second stages. The pressing force F was smaller in the second stage than in the first stage and the current C was larger in the second stage than in the first stage, and the pressing force F and the current C were controlled at the same time.

TABLE 4

| | Chemical Component | | | | |
|---|---|---|---|---|---|
| | C | Si | Mn | P | S |
| (mass %) | 0.003 | tr | 0.09 | 0.016 | 0.004 |

TABLE 5

Upper Row: Time Period (s)/Pressing Force F (N)
Lower Row: Time Period (s)/Current C (kA)

| | First Stage | Second Stage |
|---|---|---|
| Welding Condition 1 | | 0.30/400 |
| | | 0.30/7.0 |
| Welding Condition 2 | 0.06/400 | 0.24/200 |
| | 0.06/2.0 | 0.24/7.0 |

As shown in implementation conditions in Table 6, the cases where Drive Units 1 and 3 (which are Inventive Examples A and C shown in Tables 1 and 2) were used as drive units and the contact speed of the electrode 23 was 30 mm/s are defined as Inventive Examples 1 to 4. Also, the cases where Drive Unit 5 (which is Comparative Example A shown in Tables 1 and 2) was used as a drive unit are defined as Comparative Examples 1, 2, and 4. The cases where the contact speed of the spot welding electrode 34 was 50 mm/s are defined as Comparative Examples 3 and 4.

For each of the implementation conditions (Inventive Examples 1 to 4 and Comparative Examples 1 to 4) shown in Table 6, spot welding was performed at 10 points and an average value of nugget diameters of the resulting welded joints, a smallest value, a deviation of the smallest value from the average value, a largest value, a deviation of the largest value from the average value, and an appearance defect occurrence ratio were examined. The results are shown in Table 6.

In Table 6, the nugget diameter is, in a cross section taken at the center of the welded portion, a length of a molten portion on the overlapping line, formed between the upper steel sheet 21*a* and the lower steel sheet 22*a*. The appearance defects refer to surface cavities caused by melting and scattering of the welded portion between the spot welding electrode 34 and the upper steel sheet 21*a*.

If the nugget diameter is 3.0 mm or more, the nugget can be determined to be a biconvex shaped desirable nugget formed in a molten state, and can be regarded as a welded portion having a satisfactory strength. Also, if deviations of smallest and largest nugget diameters from an average value are both within the ±15% range, it is possible to assume that stable welding can be achieved.

TABLE 6

| | Implementation Conditions | | | Results | | | |
|---|---|---|---|---|---|---|---|
| | | | | | Nugget Diameter | | |
| | | | | | Smallest Value (mm) | Largest Value (mm) | Appearance |
| | Drive Unit | Contact Speed (mm/s) | Welding Condition | Average Value (mm) | [Deviation(%) from Average Value] | [Deviation(%) from Average Value] | Defect Occurrence Ratio(%) |
| Inventive Example 1 | 1 | 30 | 1 | 3.2 | 3.0 [−6] | 3.4 [6] | 0 |
| Inventive Example 2 | 1 | 30 | 2 | 3.6 | 3.4 [−6] | 3.8 [6] | 0 |
| Inventive Example 3 | 3 | 30 | 1 | 3.3 | 3.0 [−9] | 3.4 [3] | 0 |
| Inventive Example 4 | 3 | 30 | 2 | 3.6 | 3.3 [−8] | 3.8 [6] | 0 |
| Comparative Example 1 | 5 | 30 | 1 | 3.1 | 2.5 [−19] | 3.3 [6] | 20 |
| Comparative Example 2 | 5 | 30 | 2 | 3.3 | 2.7 [−18] | 3.5 [6] | 10 |
| Comparative Example 3 | 1 | 50 | 1 | 2.5 | 2.2 [−12] | 2.7 [8] | 0 |
| Comparative Example 4 | 5 | 50 | 1 | 2.3 | 1.5 [−35] | 2.8 [21] | 0 |

As shown in Table 6, in Inventive Examples 1 to 4, average nugget diameters were all more than 3.0 mm and welded portions with satisfactory strengths were obtained. Also, deviations of the smallest and largest nugget diameters from the corresponding average values were within the ±15% range, and stable welding could be achieved. No appearance defects were observed.

In Comparative Examples 1 and 2, average nugget diameters were both more than 3.0 mm. However, in each of Comparative Examples 1 and 2, a deviation of one of the smallest and largest nugget diameters from the average value was outside the ±15% range, and stable welding was not achieved. Also, appearance defects were observed. In Comparative Example 3, deviations of the smallest and largest nugget diameters from the average value were within the ±15% range. However, since the average nugget diameter was less than 3.0 mm, a welded portion with a satisfactory strength was not obtained. In Comparative Example 4, the average nugget diameter was less than 3.0 mm, and deviations of the smallest and largest nugget diameters from the average value were outside the ±15% range. That is, a welded portion with a satisfactory strength was not obtained, and stable welding was not achieved.

INDUSTRIAL APPLICABILITY

For indirect spot welding in which a member composed of at least two overlapping metal sheets is welded by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point, aspects of the present invention can provide an indirect spot welding apparatus in which a set pressing force is stably achieved within a proper pressing force range which may be lower than that in direct spot welding, an overshoot of a pressing force that occurs when the spot welding electrode is pressed against the metal sheets is reduced, and thus a welded portion with a satisfactory strength can be stably obtained.

REFERENCE SIGNS LIST

1: metal sheet
2: metal sheet
3: spot welding electrode
4: spot welding electrode
5: welded portion (nugget)
6: force controlling system
7: force controlling system
8: current controller
11: metal sheet
12: metal sheet
13: spot welding electrode
14: spot welding electrode
15-1: welded portion (nugget)
15-2: welded portion (nugget)
21: metal sheet
21a: upper steel sheet
22: metal sheet
22a: lower steel sheet
23: spot welding electrode
24: feeding point
24a: ground electrode
25: welded portion (nugget)
30: drive unit
31: servomotor
32: casing
33: linearly-movable rod
34: spot welding electrode
35: bracket
36: feeding cable
37: shunt
40: indirect spot welding apparatus
41: alternating-current power supply
42: current controller
43: primary cable
44: transformer 45: secondary cable
46: articulated robot
47: support jig
47a: metal support jig

The invention claimed is:

1. An indirect spot welding apparatus configured to weld a member composed of at least two overlapping metal sheets by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point, wherein the apparatus comprises a drive unit for pressing the spot welding electrode and controlling the pressing force, and a current controller for applying the current to the spot welding electrode, and wherein the drive unit is operable such that a lower limit in a stable pressing force region where the pressing force of the spot welding electrode against the metal sheets can be controlled within a tolerance of ±10% ranges from 70 N to 200 N and an upper limit in the stable pressing force region ranges from 800 N to 2000 N, an overshoot of the pressing force occurring when the spot welding electrode is pressed against the metal sheets is represented by OS in Equation (1), and OS is controlled to be 10% or less, and a contact speed of the spot welding electrode being pressed against the metal sheets ranges from 1 mm/s to 30 mm/s:

$$OS(\%)=(PL-AL)/AL\times 100 \tag{1}$$

where PL represents a peak pressing force (N) in an overshoot range and AL represents an average pressing force (N) applied by the electrode.

2. The indirect spot welding apparatus according to claim 1, wherein the drive unit is configured to linearly move the spot welding electrode to apply pressure to the member to be welded; the drive unit uses a servomotor as a drive source; and when the pressing force is a lower limit in the stable pressing force region, an output of the servomotor is 30% or more of a rated output.

3. A method for indirect spot welding comprising welding a member composed of at least two overlapping metal sheets by pressing a spot welding electrode against the metal sheets while applying pressure to the spot welding electrode from one side of the member, attaching a feeding point to the metal sheet on the other side of the member at a location separate from the spot welding electrode, and passing a current between the spot welding electrode and the feeding point, wherein a mounted drive unit configured to linearly move the spot welding electrode to apply pressure to the member to be welded uses a servomotor as a drive source; and wherein a lower limit in a stable pressing force region where the pressing force of the spot welding electrode against the metal sheets can be controlled within a tolerance of ±10% ranges from 70 N to 200 N and an upper limit in the stable pressing force region ranges from 800 N to 2000 N, an overshoot of the pressing force occurring when the spot welding electrode is pressed against the metal sheets is represented by OS in Equation (1), and OS is controlled to be 10% or less, and wherein a contact speed of the spot welding electrode being pressed against the metal sheets ranges from 1 mm/s to 30 mm/s:

$$OS(\%)=(PL-AL)/AL\times 100 \tag{1}$$

where PL represents a peak pressing force (N) in an overshoot range and AL represents an average pressing force (N) applied by the electrode.

4. The method for indirect spot welding according to claim 3, wherein, when the pressing force is a lower limit in the stable pressing force region, an output of the servomotor is 30% or more of a rated output.

* * * * *